(12) United States Patent
Chapman et al.

(10) Patent No.: US 8,139,681 B2
(45) Date of Patent: Mar. 20, 2012

(54) FREQUENCY ERROR CORRECTION BY USING REMODULATION

(75) Inventors: James Chapman, Cambridge (GB); Simon Richardson, Egham (GB); Cyril Valadon, Letchworth (GB); Navid Fatemi-Ghomi, Frimley (GB)

(73) Assignees: MStar Semiconductor, Inc. (KY); MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1230 days.

(21) Appl. No.: 11/662,574

(22) PCT Filed: Sep. 9, 2005

(86) PCT No.: PCT/GB2005/003486
§ 371 (c)(1),
(2), (4) Date: Sep. 6, 2007

(87) PCT Pub. No.: WO2006/027604
PCT Pub. Date: Mar. 16, 2006

(65) Prior Publication Data
US 2008/0130729 A1    Jun. 5, 2008

(30) Foreign Application Priority Data
Sep. 10, 2004  (GB) .................................. 0420186.9

(51) Int. Cl.
*H03K 9/00* (2006.01)
(52) U.S. Cl. ........ 375/316; 375/136; 375/322; 375/342; 375/344; 375/347; 370/206; 370/208; 370/210; 455/150.1

(58) Field of Classification Search .................. 375/242, 375/245, 250, 259, 295, 306, 316, 327, 350, 375/371, 375, 135, 137, 146–150, 260, 267, 375/296, 322, 342–346, 353; 370/206, 208, 370/210, 512
See application file for complete search history.

(56) References Cited

U.S. PATENT DOCUMENTS
4,447,910 A    5/1984    Smith et al.
5,228,062 A    7/1993    Bingham
(Continued)

FOREIGN PATENT DOCUMENTS
CN    1392698 A    1/2003
(Continued)

OTHER PUBLICATIONS
International Search Report dated Dec. 20, 2005.
(Continued)

*Primary Examiner* — Hirdepal Singh
(74) *Attorney, Agent, or Firm* — Edell, Shapiro & Finnan, LLC (57) ABSTRACT

A communications signal is received through a propagation channel, down-converted in frequency and then converted into a digital signal. The samples of the digital signal are processed to estimate the information conveyed by the communications signal. The estimated information is then used with knowledge about the propagation channel to model the samples of the digital signal. The modeled samples are compared with actual samples of the digital signal to deduce phase errors in the digital signal. The phase errors are then used to deduce a frequency error in the digital signal that can be used to correct the samples of the digital signal and to correct the down-conversion process.

10 Claims, 4 Drawing Sheets

U.S. PATENT DOCUMENTS

| | | | |
|---|---|---|---|
| 5,423,085 A | 6/1995 | Lim et al. | |
| 5,648,991 A | 7/1997 | Namekata et al. | |
| 5,872,801 A * | 2/1999 | Mobin | 714/794 |
| 6,148,045 A * | 11/2000 | Taura et al. | 375/344 |
| 6,181,755 B1 * | 1/2001 | Junell | 375/362 |
| 6,628,926 B1 * | 9/2003 | van de Beek et al. | 455/75 |
| 7,336,597 B2 * | 2/2008 | Maltsev et al. | 370/206 |
| 7,433,298 B1 * | 10/2008 | Narasimhan | 370/208 |
| 2003/0171102 A1 * | 9/2003 | Yang | 455/150.1 |
| 2005/0122895 A1 * | 6/2005 | Zhou et al. | 370/210 |
| 2006/0013336 A1 * | 1/2006 | Yang et al. | 375/316 |

FOREIGN PATENT DOCUMENTS

| | | |
|---|---|---|
| GB | 2262690 | 6/1993 |
| GB | 2394131 | 4/2004 |

OTHER PUBLICATIONS

Search Report under Section 17, dated Jan. 24, 2005.

* cited by examiner

FREQUENCY ERROR CORRECTION BY USING REMODULATION

CROSS-REFERENCE TO RELATED APPLICATIONS

This application is a National Phase Application of PCT/GB2005/003486, which claims priority to GB 0420186.9, which is hereby incorporated by reference.

BACKGROUND OF THE INVENTION

For most types of mobile communication system to operate satisfactorily, it is required that the receiver is locked in time and frequency to the transmitter. Traditionally, the receiver achieve-frequency synchronism with the transmitter by controlling the frequency of a local oscillator used to down-convert the signal from RF to base-band (or IF depending on the radio architecture).

Figure 1:
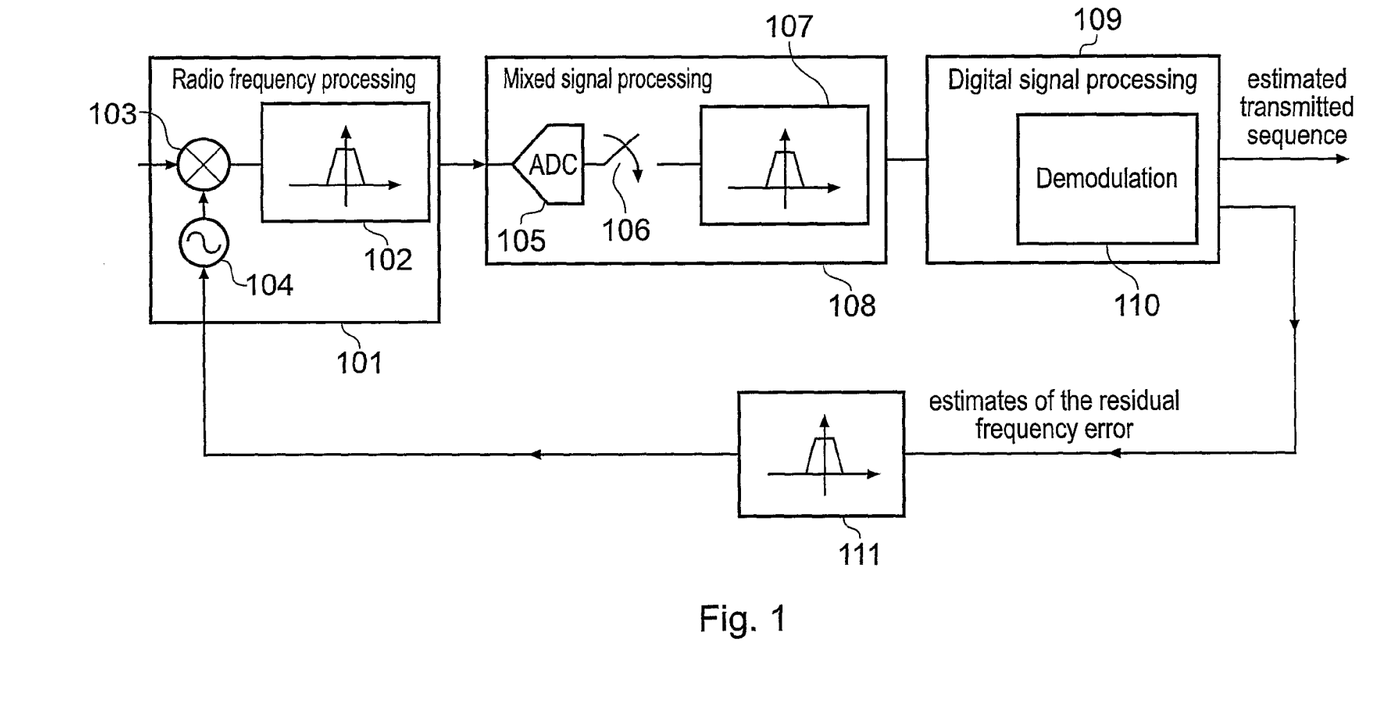
FIG. 1 presents a general mechanism for achieving frequency synchronism of a receiver with a transmitter.

FIG. 1 depicts various processing stages that form part of such an approach. Indeed, FIG. 1 can be taken to represent a view into the signal processing chain of a mobile telephone or a cellular communications network base station. It should be noted that the blocks shown in FIG. 1 represent processing operations performed on a received signal but do not necessarily correspond directly to physical units that may appear within a practical implementation of a receiver. The first stage 101 corresponds to the radio frequency processing. During the radio frequency processing, the received signal is down-converted to base-band using a mixer 103. The reference frequency used to drive the mixer is generated by an oscillator 104. Following this carrier down-conversion, the signal is low-pass filtered 102 and then passed to the mixed-signal processing stage 108. The mixed signal processing includes Analogue-to-Digital Conversion (ADC) 105, sampling 106 and low pass filtering 107. The resulting signal, which is now digital, is supplied to the digital signal processing stage 109 where it is buffered in preparation for processing. The demodulation stage 110 produces estimates of the transmitted information bits. As part of the digital signal processing, estimates of the residual frequency offset in the digital signal are produced. Those frequency error estimates are filtered at 111 in order to improve their accuracy and used to control the frequency reference produced by the oscillator 104.

This frequency locking mechanism is typical of mobile communication receivers and achieves synchronism through a feedback loop. Such an approach is very effective in conditions where the frequency reference of the transmitter is stable over time. However, such stability cannot always be achieved. For example in cellular communication systems, the hand-over of a user between different base-stations will result in a short term offset in the frequency of the received signal. This frequency offset will usually be relatively low (0.1 parts per million is a typical value) but can negatively impact on the performance of the demodulation of the signal within the receiver, especially when a high order modulation scheme is used. For example, the performance of the 8PSK modulation used by the E-GPRS (Enhanced General Packet Radio Service) system will be affected by such a small residual frequency offset. In order to limit the performance degradation that such a residual frequency offset causes to the information link, a correction of the receiver frequency reference should be made as quickly as possible. The mechanism described in FIG. 1 is therefore not suitable since the feedback loop introduces a delay in the correction made to the signal.

Figure 2:
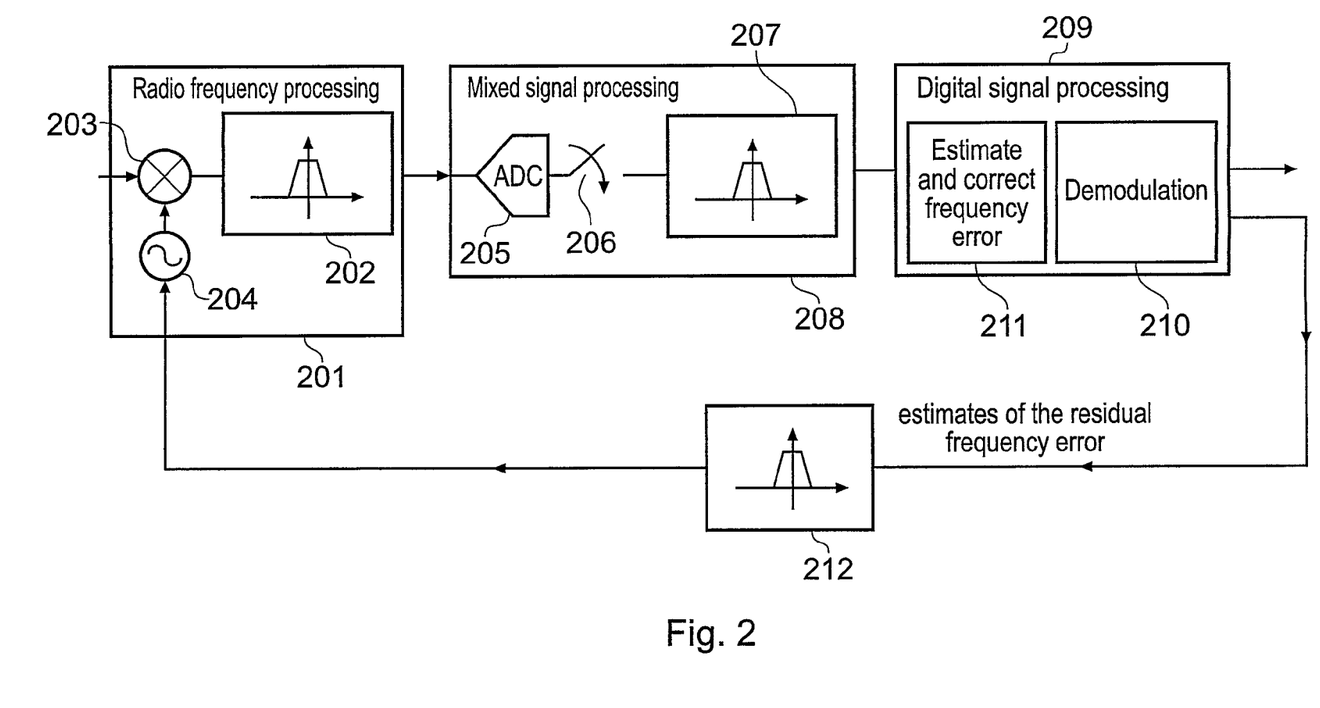
FIG. 2 presents a mechanism for achieving frequency synchronism of a receiver with a transmitter in the case where a large number of received samples are available.

One possible mechanism to correct this residual frequency offset is depicted in FIG. 2. It can be seen that this approach is similar to the one presented in FIG. 1. However, an extra processing stage has been introduced in the digital signal processing section 209. The digital signal produced by the mixed-signal processing stage 208 is buffered and first processed by the 'estimate and correct frequency error' unit 211. The resulting signal, from which the residual frequency offset will have ideally been removed, is then demodulated 210. The 'estimate and correct frequency error' unit uses the buffered received signal to first estimate the residual frequency offset. Once this frequency offset has been estimated, a phase correction to the received signal is performed in order to remove it. The residual frequency offset in the received signal can be estimated using frequency component analysis techniques. However, because the residual frequency offset is low compared to the sampling frequency, a large number of samples is usually required in order to obtain an accurate estimate.

BRIEF SUMMARY OF THE INVENTION

According to one aspect, the invention provides apparatus for analysing a digital signal representing a communications signal, comprising a series of information symbols, that has been acquired by a receiver through a propagation channel, the apparatus comprising symbol estimation means for processing samples of the digital signal to estimate symbols of the communications signal, sample simulation means for modelling at least one sample of the digital signal using estimated symbols and knowledge about the propagation channel and phase error estimation means for comparing a modelled sample of the digital signal with an actual sample of the digital signal to estimate a phase error in the latter sample.

The invention also relates to a method of analysing a digital signal representing a communications signal, comprising a series of information symbols, that has been acquired by a receiver through a propagation channel, the method comprising a symbol estimation step comprising processing samples of the digital signal to estimate symbols of the communications signal, a sample simulation step comprising modelling at least one sample of the digital signal using estimated symbols and knowledge about the propagation channel, and a phase error estimation step comprising comparing a modelled sample of the digital signal with an actual sample of the digital signal to estimate a phase error in the latter sample.

Thus, the invention provides a way of quantifying phase errors in a communications signal acquired by a receiver. Such errors may be attributable, at least in part, to imperfect frequency conversion of the acquired communications signal within the receiver.

If desired, estimated phase errors can be used to correct the digital signal representing the acquired communications signal. In certain embodiments, a phase error that is estimated from an actual sample of the digital signal and a modelled sample of the digital signal is used to correct the sample of the digital signal that follows the sample that was used to produce the phase error estimate.

In certain embodiments, phase error estimates are used to produce estimates of a frequency error in the digital signal representing the acquired communications signal. A frequency error estimate so produced may be used to correct phase errors in the digital signal and/or correct a frequency conversion process involved in the production of the digital signal.

As mentioned earlier, the invention involves the estimation of symbols of the communications signal. These estimated symbols can, for example, be in the form of modulated symbols having complex values or demodulated symbols represented by groups of bits.

The invention can be implemented by hardware or by software running on a processor or by a combination of both. The invention can be employed in a participant of a mobile communications network, such as a base station or a hand set. In particular, the invention is suited to use in a EGPRS system.

BRIEF DESCRIPTION OF THE DRAWINGS

By way of example only, certain embodiments of the invention will now be described with reference to the accompanying drawings, in which.

DETAILED DESCRIPTION OF THE INVENTION

Figure 3:
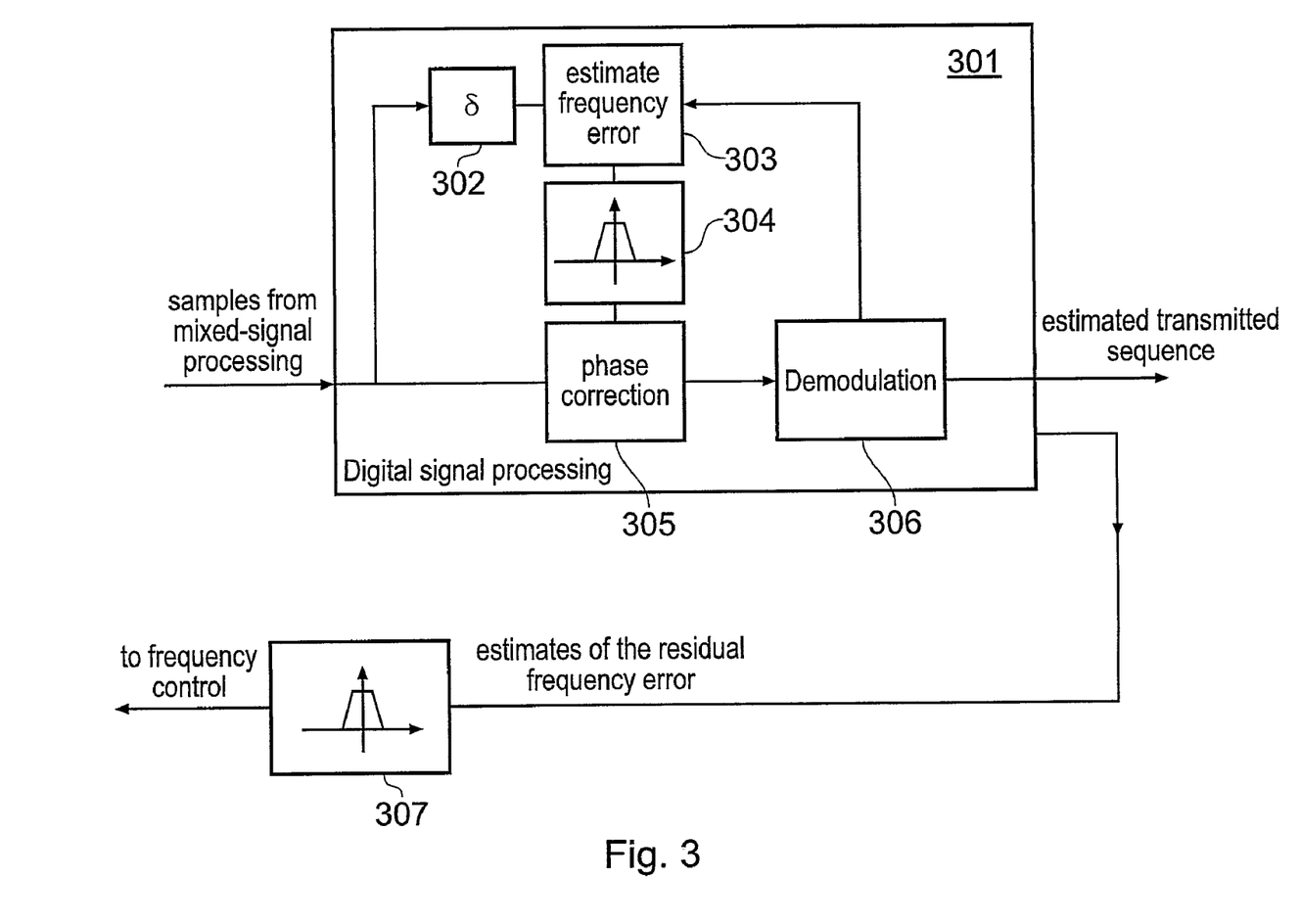
FIG. 3 presents a decision-directed approach for the phase correction of a received signal.

FIG. 3 gives an overview of a digital signal processing unit 301 that can be used in place of unit 109 to implement an embodiment of the invention. As in FIGS. 1 and 2, the signal generated by the mixed-signal processing is buffered within the digital signal processing unit 301 in preparation for processing. Each decision produced by demodulation unit 306 (analogous to unit 110) is compared with the corresponding received sample to produce an estimate of the latter's phase error, and hence current frequency offset, using unit 303. Because the demodulation unit 306 will introduce a delay in the generated decisions, a delay unit 302 is required for the received samples. Filtering, or averaging, of those frequency estimates is then performed by unit 304 in order to improve the accuracy of those estimates. This filtered frequency offset estimate is then used by unit 305 to correct the phase of the received samples. Each decision produced by the demodulation unit 306 is used as soon as available rather than at the end of the whole information block. Hence, the frequency correction can be applied to the received signal as soon as decisions are made by the demodulation unit 306. The accuracy of this frequency correction is then improved as more samples from the received signal are processed.

In order to describe the computations performed by digital signal processing stage 301, it is first useful to present the model of the transmission link.

A transmission block $\{d_k\}_{k\in(1,\ldots,D)}$ is made of D information bits $d_k \in \{0,1\}$. These information bits are first grouped into C sets of M bits (it is assumed that D=M×C):

$$\Delta_k = \{d_{M\times k}, \ldots, d_{(M\times k)+(M-1)}\}$$

Each set of M information bits $\Delta_k$ is modulated onto the complex plane using a modulation scheme M that maps sets of M bits on to the complex plane. For example, in the case of an 8PSK modulation, the modulation M can be expressed as:

$$M(\Delta_k) = M(\{d_{3\times k}, d_{3\times k+1}, d_{3\times k+2}\})$$

$$= \exp\left(2 \cdot j \cdot \pi \times \left(\frac{(4 \cdot d_{3\times k}) + (2 \cdot d_{3\times k+1}) + (1 \cdot d_{3\times k+2})}{8}\right)\right)$$

A slightly modified version of the 8PSK modulation described by the above equation is used in the E-GPRS system.

The C modulated symbols $c_k = M(\Delta_k)$ are then transmitted over the air and in the process are distorted by the propagation channel. Assuming a general model with memory for the propagation channel, the samples $\{s_k\}_{k\in(1,\ldots,C)}$ at the input of the receiver can be expressed as:

$$\begin{cases} s_k = F(c_k, \xi_{k-1}) \\ \xi_k = S(c_k, \xi_{k-1}) \end{cases}$$

$\xi_k$ represents the state (memory) of the propagation channel when the $k^{th}$ modulated symbol is transmitted. Note that any filtering performed by either the transmitter and/or the receiver can be incorporated in the propagation channel model. The mappings F and S used to model the propagation channel can be time varying. However, to simplify the notations, it is assumed in this document that those mappings do not depend on time.

At the receiver, the signal will be corrupted by noise and by the effect of the residual frequency offset between the transmitter and the receiver. Taking into account these effects, the signal which is input to the digital signal processing unit 301 can be expressed as:

$$r_k = e^{j\times\theta_k} \times s_k + n_k$$

where $\{n_k\}_{k\in(1,\ldots,C)}$ denotes the sequence of additive noise samples and the $e^{j\times\theta_k}$ multiplicative term models the effect of the residual frequency offset on the received signal. The phase offset on the $k^{th}$ sample can be expressed as:

$$\theta_k = (k \times \Theta) + \theta_0$$

where Θ denotes the residual angular frequency offset and is related to frequency error through:

$$f = \frac{\Theta}{2\pi} \cdot f_s$$

where $f_s$ is the sampling frequency.

The operation of the digital signal processing stage 301 in correcting the residual phase offset in a received data stream will now be described with the aid of FIGS. 3 and 4, the latter Figure showing in more detail the operations that occur within the digital signal processing stage 301.

After the reception of the $k^{th}$ complex sample $r_k$, the demodulator 306/401 produces an estimate of the transmitted symbol $\Delta_{k-\delta}$. The delay δ in the symbol decisions produced by the demodulator 306/401 can be explained by the fact that the propagation channel between the transmitter and the receiver has memory. Hence, the transmitted information is spread over multiple received symbols and the demodulator 306/401 will usually combine the information in those different symbols in order to improve its performance. The symbol decision produced by the demodulation unit 306/401 is denoted $\hat{\Delta}_{k-\delta}$.

Using knowledge of the modulation used by the transmitter, the digital signal processing stage 301 can then generate an estimate of the transmitted complex symbol $c_{k-\delta}$. This estimated complex symbol is denoted $\hat{c}_{k-\delta}$. It should be noted that the digital signal processing stage 301 may not have prior knowledge of the modulation scheme M being used by the transmitter and hence may have to deduce the modulation scheme from the signal stream arriving from the mixed signal unit 108. This is the case in, for example, the EGPRS system where the transmitter can select between the GMSK and 8PSK modulation schemes without explicitly providing this format information to the receiver.

Assuming that the digital signal processing stage 301 has knowledge of the propagation channel conditions, modelled by the mappings F and S, it is possible for the digital signal processing stage to generate an estimate of the complex symbol $s_{k-\epsilon}$. This estimate is denoted $\hat{s}_{k-\delta}$.

It should be noted that the digital signal processing stage 301 will usually not have prior knowledge of the propagation channel conditions. However, it may be possible for the digital signal processing stage 301 to generate an estimate of the channel mappings. In this case, the digital signal processing stage 301 can generate the complex symbol $\hat{s}_{k-\delta}$ using those estimates rather than the true mappings. For example, in the EGPRS system, the sequence of transmitted symbols includes a pattern, referred to as training sequence, which is known to the receiver. The receiver can use this training sequence to generate an estimate of the propagation channel conditions.

If one assumes that the channel estimation is perfect, then the symbol $\hat{s}_{k-\delta}$ corresponds to the received symbol $r_{k-\delta}$ a without additive noise or residual frequency offset. This means that, if the noise in the received sample $r_{k-\delta}$ is ignored, the phase difference between the two samples is equal to $\theta_{k-\delta}$. This relation can be used to estimate the residual frequency offset.

One possible way to produce an estimate $\hat{\theta}_{k-\delta}$ of the phase difference is through the complex multiplication of the received symbol $r_{k-\delta}$ with the complex conjugate of the re-modulated symbol $\hat{s}_{k-\delta}$. This modulation produces the following complex symbol:

$$p_k = r_{k-\delta} \times \hat{s}_{k-\delta} = e^{j \times \theta_{k-\delta}} \times (s_{k-\delta} \times \hat{s}_{k-\delta}) + (n_{k-\delta} \times \hat{s}_{k-\delta})$$

If one ignores the noise term and assumes that the symbol $\hat{s}_{k-\delta}$ was generated perfectly, the symbol $p_k$ can be expressed as:

$$p_k = e^{j \times \theta_{k-\delta}} \|s_{k-\delta}\|^2$$

Hence, the estimate $\hat{\theta}_{k-\delta}$ can be generated by computing the phase of the complex sample $p_k$.

It should be noted that a different set of computations could be performed to estimate the phase difference $\hat{\theta}_{k-\delta}$ from the received symbol $r_{k-\delta}$ and the re-modulated symbol $\hat{s}_{k-\delta}$.

One such alternative method will now be described in detail. In this method, it is assumed that the phase error is small such that the sine of the phase error can taken to be an approximation of the phase error. Thus:

$$\hat{\theta}_{k-\delta} \cong \frac{\text{Im}(p_k)}{\sqrt{\text{Re}(p_k)^2 + \text{Im}(p_k)^2}}$$

where $\text{Re}(p_k)$ and $\text{Im}(p_k)$ are the real and imaginary part of $p_k$. Within the digital signal processing stage 301, the preceding equation can be implemented as a form of Taylor series expansion as follows:

$$\hat{\theta}_{k-\delta} \cong \text{Im}(p_k)(1 + 0.25 \times Z + 0.09375 \times Z^2 + 0.0390625 \times Z^3 + 0.017089844 \times Z^4 + 0.00769043 \times Z^5 + 0.00352478 \times Z^6 + 0.001636505 \times Z^7 + 0.000767112 \times Z^8)$$

where Z is defined as:

$$Z = 2 \times (1 - (\text{Re}(p_k)^2 + \text{Im}(p_k)^2))$$

An estimate of the residual frequency offset can then be generated from the phase difference estimates for a series of demodulated symbols $\hat{c}_{k-\delta}$. This estimate is denoted as $\hat{\Theta}_k$. The estimated residual frequency offset and the estimated phase difference are linked through the following equation:

$$\hat{\theta}_{k-\delta} = ((k-\delta) \times \hat{\Theta}_k) + \hat{\theta}_0$$

Hence the residual frequency offset can be estimated by performing a linear regression on the phase difference estimates $\hat{\theta}_{k-\delta}$. If, for example, the linear regression minimises the mean square error, the residual frequency offset can be computed using the following equation $$\hat{\Theta}_k = \frac{12 \times \left(\sum_{i=0}^{k-\delta} i \cdot \hat{\theta}_i\right) - 6 \times (k-\delta) \times \left(\sum_{i=0}^{k-\delta} \hat{\theta}_i\right)}{(k-\delta+1)^3 - (k-\delta+1)}$$

where $i=0$ to $k-\delta$ and denotes all of phase difference estimates calculated so far for the current burst.

The initial phase $\hat{\theta}_0$ can be estimated using the following equation:

$$\hat{\theta}_0 = \frac{(4 \times (k-\delta+1)^2 - 6 \times (k-\delta+1) + 2) \times \left(\sum_{i=0}^{k-\delta} \hat{\theta}_i\right) - 6 \times (k-\delta) \times \left(\sum_{i=0}^{k-\delta} i \cdot \hat{\theta}_i\right)}{(k-\delta+1)^3 - (k-\delta+1)}$$

It is to be noted that this initial phase is re-estimated for each new sample $\hat{\theta}_i$ produced by the demodulation unit 306/401.

The estimates of the residual frequency offset $\hat{\Theta}_k$ and the initial phase $\hat{\theta}_0$ are then used to correct the phase of the next received symbol to be processed by the demodulation unit 306/401. This is achieved by arranging that the next received symbol $r_{k+1}$ to be processed by the demodulation unit 306/401 is multiplied by the complex phasor:

$$e^{-j \times (((k+1) \times \hat{\Theta}_k) + \hat{\theta}_0)}$$

At that point, assuming that the linear regression estimated perfectly the residual frequency offset $\hat{\Theta}_k$ and the initial phase $\hat{\theta}_0$, the modified symbol to be processed by the demodulation unit does not have any phase error.

For communication systems where the channel conditions are estimated using a sequence of known transmitted symbols, it is possible to improve the accuracy of the estimates of the residual frequency offset $\hat{\Theta}_k$ and the initial phase $\hat{\theta}_0$ by performing the linear regression using symbols close to this training sequence first. In this case, the initial phase $\hat{\theta}_0$ will be incorporated in the model of the propagation channel. Moreover, because the initial phase $\hat{\theta}_0$ does not need to be estimated, the computational complexity is also reduced.

For example, in the EGPRS system, a sequence of 26 known symbols is inserted in the middle of a burst of information. When symbols close to the training sequence are used, the residual frequency error $\hat{\omega}_k$ can be estimated using the following equation:

$$\hat{\omega}_k = \frac{6 \times \left(\sum_{i=0}^{k-\delta} i \cdot \theta_i\right)}{2 \times (k-\delta+1)^3 - 3 \times (k-\delta+1)^2 + (k-\delta+1)}$$

The phasor used to correct the phase of the next symbol to be processed by the demodulation unit is then equal to:

$$e^{-j \times (((k+1) \times \hat{\omega}_k))}$$

It should be noted that the quality of the samples $\hat{\theta}_i$ which are processed by the linear regression is degraded by the noise that is present in the received signal data stream. It is therefore possible to improve the accuracy of the estimate $\hat{\omega}_k$ by ignoring samples $\hat{\theta}_i$ that are deemed too noisy. For example, $\hat{\omega}_k$ can be calculated using the following equation:

$$\hat{\omega}_k = \frac{\left(\sum_{i=0}^{k-\delta} i \cdot \lambda_i \cdot \theta_i\right)}{\left(\sum_{i=0}^{k-\delta} i^2 \cdot \lambda_i\right)}$$

where $\lambda_i\{0,1\}$ is a weight indicating whether the phase sample $\hat{\theta}_i$ is excised or not. The preceding equation is based on the a priori assumption that $\hat{\theta}_0$ is zero.

Different approaches can be taken to decide whether a phase sample should be excised. For example, a sample $\hat{\theta}_i$ could be discarded (i.e., $\lambda_i$ set to 0) if it is more than a given distance away from the line fitted to the $\hat{\theta}_i$ data by the linear interpolation. Another option is to use any prior knowledge that the receiver may have about the maximum that is possible for the residual frequency error. For example, if the receiver knows that $\hat{\omega}_k \leq \hat{\omega}_{max}$, then it is possible to check that the current phase sample $\hat{\theta}_i$ lies within the region defined by $\hat{\omega}_{max}$. Given a priori limits $\hat{\omega}_k \leq \hat{\omega}_{max}$, it is possible to calculate the line (of phase error versus received sample index) with the highest allowable gradient (since the phase error for a given sample is proportional to the sample index and the frequency offset—hence the use of the linear regression to estimate the frequency error). If the phase were estimated perfectly, the phase for the $k^{th}$ sample would never be larger than $(k \times \hat{\omega}_{max}) + \theta_0$. Hence, samples for which the phase estimate is larger than that can be excised. It should be noted, however, that since in practice the phase estimates will be noisy, only the samples which are larger than the ideal maximum value plus a statistical margin should be removed. It will also be understood that, since the frequency error can be positive or negative, the region corresponding to valid phase estimates needs to contain both positive and negative phase estimates. Finally, the check on the phase error being lower than the expected $(k \times \hat{\omega}_{max}) + \theta_0$ requires the knowledge of $\theta_0$. One solution is to use an up to date estimate of $\theta_0$ from the linear regression. Another solution is to use a fixed, pre-defined, value.

Figure 4:
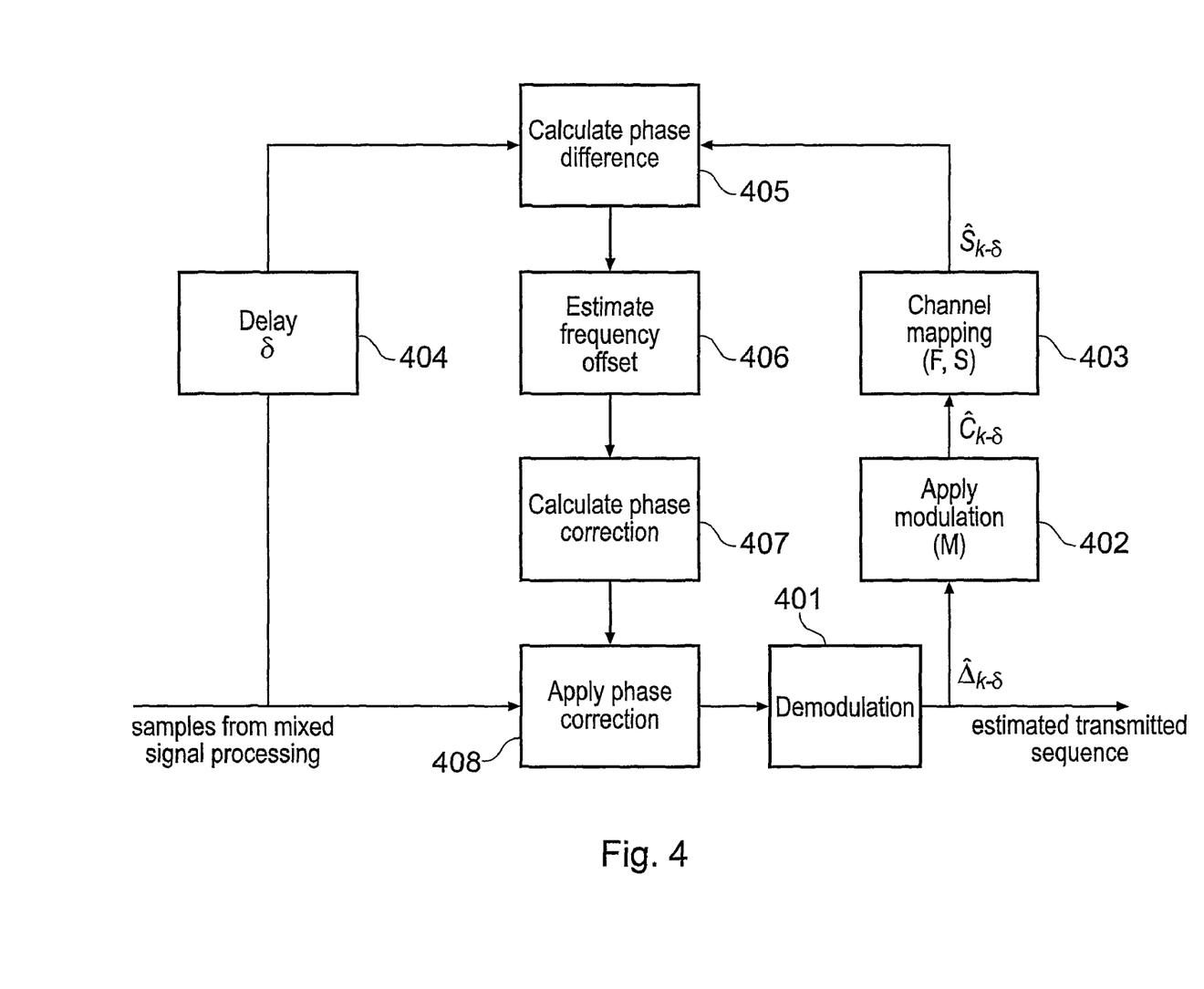
FIG. 4 describes various computations performed in the approach shown in FIG. 3.

FIG. 4 describes how the various computations described above are put together in order to correct the residual frequency offset in the received signal. The demodulation unit 401 provides estimates of the transmitted information symbols $\hat{A}_{k-\delta}$. Those information symbols are then modulated through unit 402. The channel mapping performed by unit 403 is then applied to those modulated symbols. This produces estimates of the received symbols $\hat{s}_{k-\delta}$. Those symbols are combined with the received symbols $s_{k-\delta}$. The time synchronism of those two data streams is achieved by the delay unit 404. The phase difference samples $\hat{\theta}_{k-\delta}$ are computed by unit 405 and are then processed by unit 406. Unit 406 performs the linear regression on the phase difference samples (including, if desired, sample excision) and produces an estimate of the residual frequency error $\hat{\omega}_k$ and, depending on the variant, the initial phase $\hat{\theta}_0$. This information is then used by the phase correction unit 408 to de-rotate the received symbol stream.

It should be noted that, in some cases, the modulation unit 402 and the channel mapping unit 403 may not be required. This is the case when the demodulation unit 401 outputs not only estimates of the transmitted information symbols $\hat{A}_{k-\delta}$ but also estimates of the modulated symbols $\hat{s}_{k-\delta}$. For example, if the demodulation technique used within unit 401 is based on the Viterbi algorithm, the samples $\hat{s}_{k-\delta}$ are usually required during the computations performed to derive the information symbols $\hat{A}_{k-\delta}$. In such circumstances it is then not necessary to replicate those computations in the modulation unit 402 and the channel mapping unit 403.

It should also be noted that the residual frequency offset estimate $\hat{\omega}_k$ used to perform the phase correction on the received symbols in unit 408 can also be used to drive the feedback loop controlling the local oscillator (unit 111 in FIG. 1).

The invention claimed is:

1. A system comprising:
    a receiver for acquiring a communications signal, comprising a series of information symbols, through a propagation channel; and
    an apparatus for deducing one or more frequency error estimates from a digital signal produced by the receiver to represent the communications signal, the apparatus configured for analyzing the digital signal representing the communications signal, comprising the series of information symbols, that has been acquired by the receiver through the propagation channel, the apparatus comprising:
        symbol estimation means for processing samples of the digital signal to estimate symbols of the communications signal;
        sample simulation means for modeling at least one sample of the digital signal using the estimated symbols and knowledge about the propagation channel;
        phase error estimation means for comparing a modeled sample of the digital signal with an actual sample of the digital signal to estimate a phase error in the latter sample;
        frequency error estimation means for estimating a frequency error from phase errors produced by the phase error estimation means,
        wherein each phase error produced by the phase error estimation means is made available for correction of the digital signal sample, if any, that follows the digital signal sample on which the phase error was estimated,
    wherein the receiver comprises frequency conversion means for down-converting the received communications signal in frequency and frequency control means for controlling the frequency conversion means on the basis of one or more frequency error estimates.

2. The system according to claim 1, wherein the communications signal contains a sequence of training symbols and the sample simulation means only utilizes estimated symbols that lie close to that training sequence.

3. The system according to claim 1, wherein the frequency error estimation means uses a linear regression technique to calculate the frequency error estimate.

4. The system according to claim 1, wherein the frequency error estimation means discriminates noisy phase errors and excludes them from the frequency error estimation.

5. The system according to claim 1, further comprising means for correcting samples of the digital signal on a basis of one or more frequency error estimates produced by the frequency error estimation means.

6. A signal processing method comprising:
   receiving a communications signal, comprising a series of information symbols, through a propagation channel; and
   deducing one or more frequency error estimates from a digital signal produced to represent the communications signal by analyzing the digital signal representing the communications signal, comprising the series of information symbols, that has been acquired by a receiver through the propagation channel, the method comprising:
      a symbol estimation step comprising processing samples of the digital signal to estimate symbols of the communications signal;
      a sample simulation step comprising modeling at least one sample of the digital signal using the estimated symbols and knowledge about the propagation channel;
      a phase error estimation step comprising comparing a modeled sample of the digital signal with an actual sample of the digital signal to estimate a phase error in the latter sample; and
      a frequency error estimation step comprising estimating a frequency error from phase errors produced by the phase error estimation step,
      wherein each phase error that is estimated is made available for the correction of the digital signal sample, if any, that follows the digital signal sample on which the phase error was estimated,
   wherein the process of receiving the communications signal comprises a frequency conversion step for down-converting the received communication signal in frequency and the frequency conversion process is controlled on the basis of one or more frequency error estimates.

7. The signal processing method according to claim 6, wherein the communications signal contains a sequence of training symbols and the sample simulation step only utilizes estimated symbols that lie close to that training sequence.

8. The signal processing method according to claim 6, wherein the frequency error estimation step uses a linear regression technique to calculate to the frequency error estimate.

9. The signal processing method according to claim 6, wherein the frequency error estimation step discriminates noisy phase errors and excludes them from the frequency error estimation.

10. The signal processing method according to claim 6, further comprising a correcting step for correcting samples of the digital signal on a basis of one or more frequency error estimates produced by the frequency error estimation step.

* * * * *